(12) United States Patent
Farnsworth et al.

(10) Patent No.: US 7,014,419 B2
(45) Date of Patent: Mar. 21, 2006

(54) PASSIVE IMPROVED AIR TURBINE STARTER LUBRICATION SYSTEM

(75) Inventors: Gary A. Farnsworth, Scottsdale, AZ (US); Larry K. Ball, Chandler, AZ (US); Kellan P. Geck, Chandler, AZ (US); Todd A. Langston, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 99 days.

(21) Appl. No.: 10/788,757

(22) Filed: Feb. 27, 2004

(65) Prior Publication Data

US 2005/0191166 A1    Sep. 1, 2005

(51) Int. Cl.
*F01D 25/00* (2006.01)

(52) U.S. Cl. ...................... 415/113; 137/855
(58) Field of Classification Search ........ 415/111–113, 415/156; 137/460, 521, 855
See application file for complete search history.

(56) References Cited

U.S. PATENT DOCUMENTS

| | | | |
|---|---|---|---|
| 387,961 A | 8/1888 | Ryan | |
| 530,442 A | 12/1894 | Munger | |
| 719,654 A | 2/1903 | Ewing, Jr. | |
| 1,536,127 A | 5/1925 | Newton | |
| 2,372,456 A | 3/1945 | Stewart | |
| 3,036,592 A | 5/1962 | Lips | |
| 3,085,591 A | 4/1963 | Schneider | |
| 3,170,292 A | 2/1965 | Howes et al. | |
| 3,245,669 A | 4/1966 | Huggins et al. | |
| 3,457,948 A | 7/1969 | Niedermayer | |
| 3,472,024 A | 10/1969 | Strub et al. | |
| 3,807,444 A | * 4/1974 | Fortune | 137/512.1 |
| 3,811,470 A | 5/1974 | Schaefer | |
| 3,924,708 A | 12/1975 | Dabrowka | |
| 3,941,145 A | 3/1976 | Morain et al. | |
| 4,046,222 A | 9/1977 | Skrivanek et al. | |
| 4,077,202 A | 3/1978 | Schutze | |
| 4,100,935 A | 7/1978 | Harnish | |
| 4,383,549 A | 5/1983 | Maldavs | |
| 4,525,995 A | 7/1985 | Clark | |
| 4,605,039 A | 8/1986 | Johnson et al. | |
| 4,638,835 A | 1/1987 | Chuang | |
| 4,779,413 A | 10/1988 | Mouton | |
| 4,825,897 A | 5/1989 | Shade | |
| 4,944,327 A | 7/1990 | Gyben | |
| 4,960,085 A | 10/1990 | Coons | |
| 5,042,963 A | * 8/1991 | Sorenson et al. | 415/18 |
| 5,235,812 A | 8/1993 | Klaass et al. | |
| 5,249,597 A | 10/1993 | Thomas | |
| 5,462,081 A | 10/1995 | Perusek et al. | |
| 5,636,848 A | 6/1997 | Hager et al. | |

(Continued)

*Primary Examiner*—Ninh H. Nguyen
(74) *Attorney, Agent, or Firm*—Ingrassia Fisher & Lorenz (57) ABSTRACT

A passive ATS lubrication system is provided that includes a starter housing, a receptacle and two valves. The starter housing is adapted to couple to a gearbox assembly and includes a supply opening and an exhaust opening that are each configured to provide fluid communication between the gearbox assembly and the starter housing. The receptacle is coupled to the starter housing proximate the supply opening to thereby define a reservoir. The first valve is disposed within the reservoir and configured to open or close the supply opening in response to a pressure differential between the starter housing and the gearbox assembly. The second valve is coupled to the starter housing proximate to the exhaust opening and configured to open or close the exhaust opening in response to the pressure differential between the starter housing and the gearbox assembly.

29 Claims, 4 Drawing Sheets

U.S. PATENT DOCUMENTS

| | | | |
|---|---|---|---|
| 5,885,064 A * | 3/1999 | McCoy .................... 417/569 |
| 5,911,678 A | 6/1999 | White |
| 5,941,532 A | 8/1999 | Flaherty et al. |
| 5,979,488 A | 11/1999 | Smith et al. |
| 6,004,037 A | 12/1999 | Harris et al. |
| 6,263,912 B1 | 7/2001 | Brown et al. |
| 6,296,014 B1 * | 10/2001 | Miura et al. ............ 137/592 |
| 6,378,293 B1 | 4/2002 | Care et al. |
| 2003/0059294 A1 | 3/2003 | Olsen |
| 2003/0145602 A1 | 8/2003 | Lane et al. |

* cited by examiner

PASSIVE IMPROVED AIR TURBINE STARTER LUBRICATION SYSTEM

CROSS-REFERENCE TO RELATED APPLICATIONS

The present application is related to U.S. patent application Ser. No. 10/732,935, entitled AIR TURBINE STARTER HAVING A LOW DIFFERENTIAL CHECK VALVE, filed Dec. 10, 2003, which is assigned to the Assignee of the present application.

FIELD OF THE INVENTION

The present invention relates to an air turbine starter, and more particularly, an air turbine starter having an improved passive lubrication system.

BACKGROUND OF THE INVENTION

An air turbine starter (ATS) is typically used to start an aircraft turbine engine, for example, a gas turbine jet engine. The ATS is typically mounted to the jet engine through a gearbox or other transmission assembly and a cover plate or wall is located between the starter and gearbox housings. The gearbox transfers power from the ATS to the engine to start the engine.

Many air turbine starters typically include lubrication to run properly. Some air turbine starters use an assisted wet cavity design (AWC) to assist in lubrication. These designs include a turbine starter housing having a mounting face or mounting flange that is sealingly engaged with, and coupled to, the gearbox such that a porting system, that allows transfer of lubricating oil between the gearbox and the starter, is defined. Each port in the porting system is typically in fluid communication with passages within the starter housing so that oil can be distributed within the starter, and are located in portions of the starter-gearbox assembly such that they act as sump passages or oil return passages. The transfer of lubricating oil is intended to keep the oil within the starter housing fresh and clean.

Typically in AWC designs, fluids flow from the gearbox into an enclosure that is attached to the housing of the starter. This enclosure is in fluid communication with the starter. The exchange of oil between this enclosure and the starter is governed by movement of the fluid during aircraft operation, mechanical stirring within the starter, fluid diffusion and incidental fluid agitation caused by the fluid stream from the gearbox. The resulting exchange of fluid does not keep the oil as fresh as desired. The gearbox may be pressurized at about 0.1–6.0 psi above ambient pressure. Though highly unlikely, it is postulated that the starter housing may become punctured, causing a breach in the starter structure and a change in pressure. In such a highly unlikely instance, the starter pressure may drop to equalize with ambient pressure. Consequently, the pressure differential between the gearbox and starter may be about 0.1 to 6.0 psi. If oil is continuously fed to the starter during starter housing breach, excessive oil may still leak from the gearbox to the starter and, consequently, out through the breach even though the pressure differential is relatively small. Eventually, sufficient oil is lost that may cause problems in the gearbox. U.S. patent application Ser. No. 10/732,935 describes check valves that may be used to counteract the oil loss. However, because the pressure differential between the starter and gearbox can be small, these valve types may not work consistently.

Accordingly, there is a need for an aircraft turbine starter that allows fresh oil to freely flow from the gearbox to the starter, but can safely discontinue flow in the condition of starter housing puncture. Additionally, there is a need for an air turbine starter with the ability to operate during starter housing breach, and in particular, in instances when the breach causes a low pressure differential between the starter and gearbox. Furthermore, other desirable features and characteristics of the present invention will become apparent from the subsequent detailed description of the invention and the appended claims, taken in conjunction with the accompanying drawings and this background of the invention.

SUMMARY OF THE INVENTION

The present invention provides an air turbine starter including a passive ATS lubrication system that includes a starter housing, a receptacle and two valves. The starter housing is adapted to couple to a gearbox assembly and includes a supply opening and an exhaust opening that are each configured to provide fluid communication between the gearbox assembly and the starter housing. The receptacle is coupled to the starter housing proximate the supply opening to thereby define a reservoir. The first valve is disposed within the reservoir and configured to open or close the supply opening in response to a pressure differential between the starter housing and the gearbox assembly. The second valve is coupled to the starter housing proximate to the exhaust opening and configured to open or close the exhaust opening in response to the pressure differential between the starter housing and the gearbox assembly.

In another embodiment, and by way of example only, a check valve assembly including a valve flexure and a valve seat. The check valve assembly is for placement proximate an opening in a wall separating a first environment and a second environment. The valve flexure, at least a portion of which is coupled to the wall proximate the opening, is configured to selectively move between a valve open and valve close position in response to the pressure differential between the first and second environments. The valve seat coupled to the wall concentric to the opening and configured to selectively contact the valve flexure to provide a leak tight seal when the valve flexure is in a close position.

In yet another embodiment, a system for providing fluid between a gearbox and an air turbine starter is provided. The system comprises a plate, a receptacle, a supply line, and first and second valves. The plate is positioned between and adapted to couple to a gearbox assembly and air turbine starter, and includes a supply opening and an exhaust opening, each configured to provide fluid communication between the gearbox assembly and the air turbine starter. The receptacle is coupled to the starter housing proximate the supply opening to thereby define a reservoir. The supply line is in fluid communication with the reservoir and is configured to supply fluid from the gearbox to the starter housing. The first valve is disposed within the reservoir and configured to open or close the supply opening in response to a pressure differential between the starter housing and the gearbox assembly. The second valve is coupled to the starter housing proximate to the exhaust opening and configured to open or close the exhaust opening in response to the pressure differential between the starter housing and the gearbox assembly.

Other independent features and advantages of the preferred air turbine starter will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it should be appreciated that the present invention is not limited to use in conjunction with a specific type of rotating machine. Thus, although the present invention is, for convenience of explanation, depicted and described as being implemented in a turbine starter, it should be appreciated that it can be implemented in numerous other machines including, but not limited to, a gas turbine engine, a hydraulic pump, a water pump, or various other chemical and industrial pumps.

Figure 1:
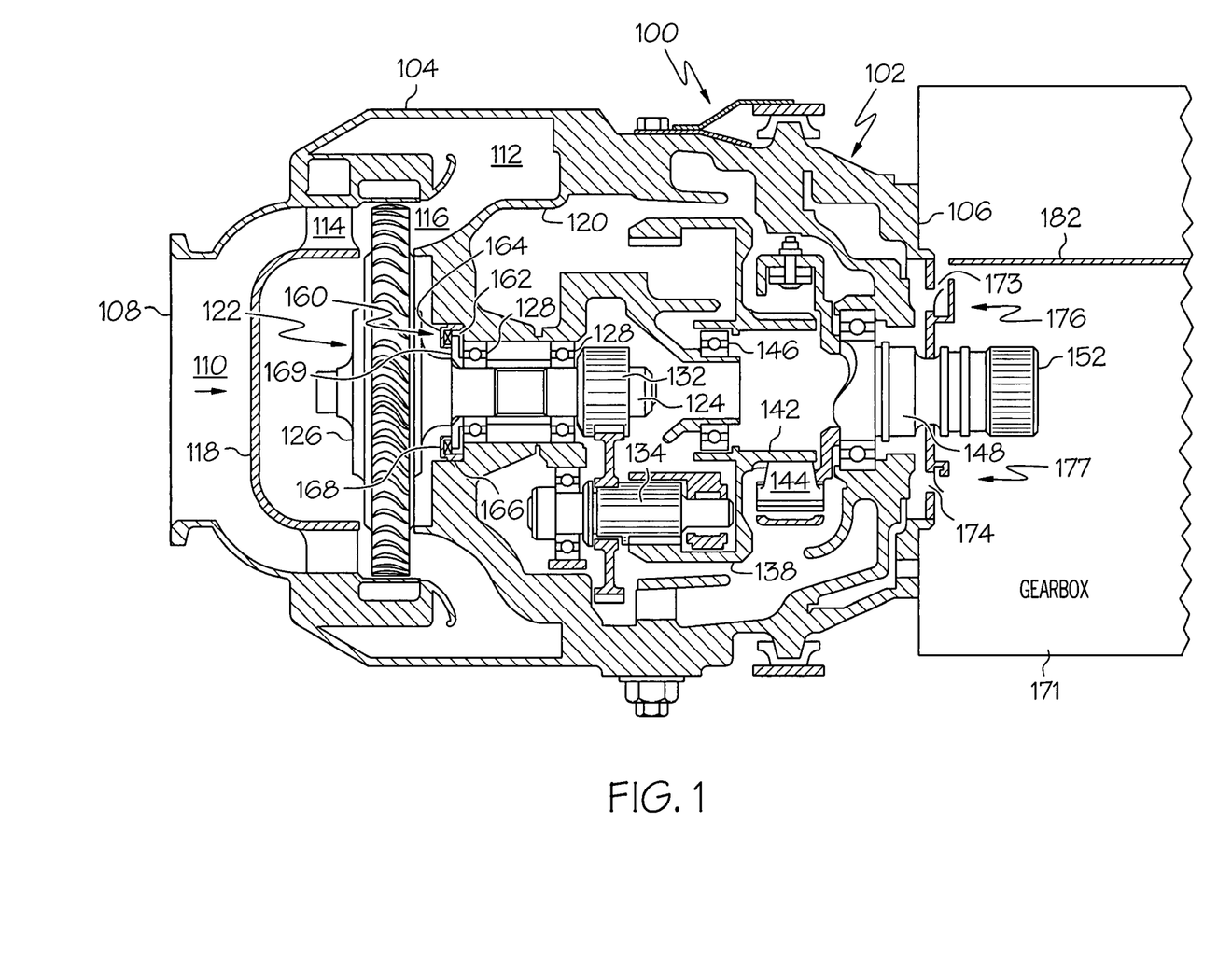
FIG. 1 is a cross sectional view of an air turbine starter (ATS) having an exemplary embodiment of inlet and outlet check valve assemblies coupled thereto.

Turning now to the description, a cross sectional view of an exemplary air turbine starter (ATS) that is used to initiate the rotation of a larger turbine, such as a turbofan jet engine, is depicted in FIG. 1. An exemplary check valve assembly 176 is shown coupled thereto. The ATS 100 is enclosed within a housing assembly 102 that includes at least a turbine section 104 and an output section 106. The housing assembly 102 may be made up of two or more parts that are combined together or may be integrally formed as a single piece. The housing assembly 102 includes an inlet plenum 108, which directs compressed air into the housing assembly 102. The compressed air received at the plenum 108 flows through an annular flow channel 110 and out a radial outlet port 112. The annular flow channel 110 includes an axial flow portion 114 and a substantially curved radial flow portion 116. The axial flow portion 114 is formed through a stator assembly 118 that is mounted within the housing assembly turbine section 104 proximate the inlet plenum 108. The radial flow portion 116, which flares the annular flow channel 110 radially outwardly, is formed between a portion of the housing assembly turbine section 104 and an exhaust housing 120 that is mounted within the housing assembly 102.

A turbine wheel 122 is rotationally mounted within the housing assembly turbine section 104. In particular, the turbine wheel 122 has an output shaft 124 that extends from a hub 126, through the exhaust housing 120, and into the housing assembly output section 106. The turbine wheel output shaft 124 is rotationally mounted in the housing assembly output section 106 by bearing assemblies 128. A gear 132 is coupled to the turbine wheel output shaft 124, and meshes with a compound planetary gear train 134. The compound planetary gear train 134 engages a ring gear 138 and a hub gear 142, which is in turn coupled to an overrunning clutch 144. During operation of the ATS 100, this gearing configuration converts the high speed, low torque output of the turbine wheel output shaft 124 into low speed, high torque input for the overrunning clutch 144.

The overrunning clutch 144, as noted above, is coupled to the hub gear 142, which is supported by another bearing assembly 146. A drive shaft 148 extends from the overrunning clutch 144, through the turbine housing output section 106, and is coupled to a turbine output shaft 152. The output shaft 152 is, in turn, coupled to the turbofan jet engine gearbox 171.

The gearbox 171 typically includes a plurality of passages (not shown) through which oil freely passes to supply lubrication to the gearbox 171 components. The passages are in fluid communication with oil flow passages within the turbine housing assembly output section 106 via openings 173, 174 (also shown in FIG. 2) that, in this embodiment, are formed within the starter housing 102 and the gearbox 171. Preferably, an inlet and an outlet check valve assembly 176, 177 are placed adjacent or within each of the openings 173, 174. In this embodiment, the check valve assemblies 176, 177 are adjacent to each of the openings 173, 174. The check valve assemblies 176, 177 each operate according to a pressure differential existing between the interior portion of the gearbox 171 and the interior of the ATS 100. Thus, the check valve assemblies 176, 77 selectively open and close the openings 173, 174 based on the pressure differential between the gearbox 171 and ATS 100.

Lubricating oil is sealed within the ATS assembly 100 via a face seal assembly 160. Specifically, the face seal assembly 160 provides a fluid tight seal between the rotating turbine wheel 122 and the oil held inside of the housing assembly turbine section 104 and the housing assembly output section 106. The face seal assembly 160 includes a rotor 162, and a stator seal assembly 164 that includes a seal case 166 and a seal stator ring 168. The rotor 162 is mounted on the turbine wheel output shaft 124, and has an axially facing flange 169 that extends radially outwardly away from the turbine wheel output shaft 124. The seal case 166 is mounted to the exhaust housing 120 and surrounds the turbine wheel output shaft 124. The seal stator ring 168 is housed within the seal case 166 and sealingly engages the axially facing flange 169 of the rotor 162, providing the fluid tight seal between the rotating turbine wheel output shaft 124 and the oil held inside of the turbine housing 104 and output 106 sections. Though not explicitly depicted, it should be appreciated that another face seal assembly 160 may also be included in the ATS 100 that seals the turbine output shaft 152.

Figure 2:
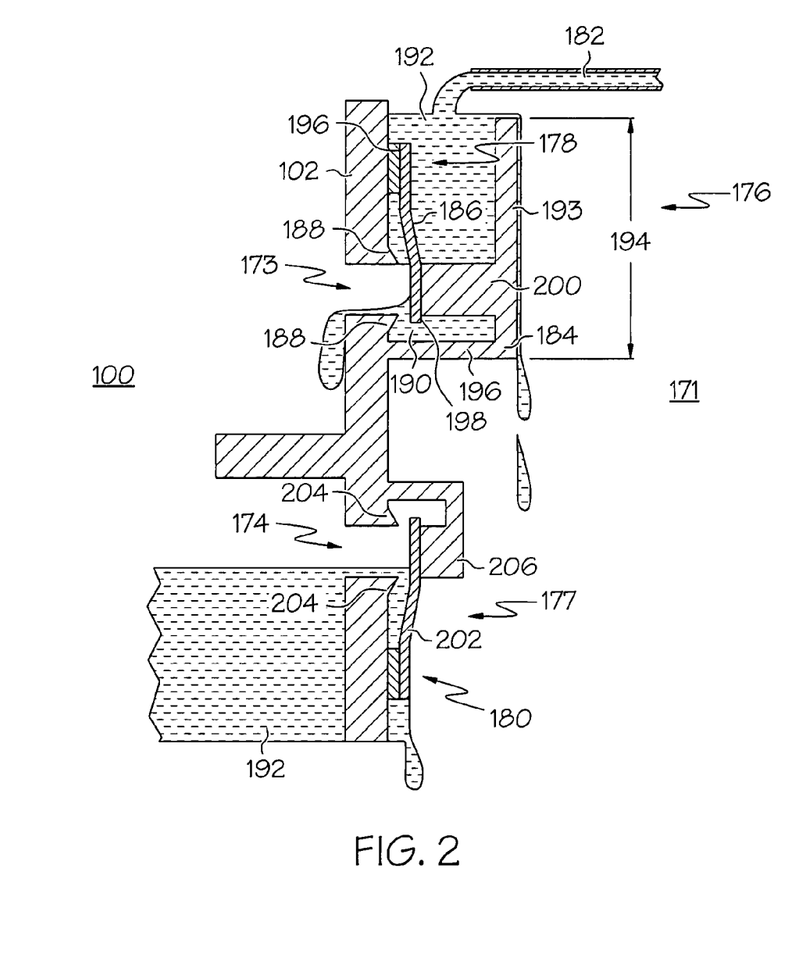
FIG. 2 is a detail and cutaway view of a portion of the air turbine starter of FIG. 1 including an exemplary embodiment of the inlet and outlet check valve assemblies under normal operating conditions.

FIG. 2 illustrates a detail and cutaway view of a portion of the starter 100 of FIG. 1 including inlet and outlet the check valve assemblies 176, 177 according to an exemplary embodiment. Each opening 173, 174 in this embodiment serves a different purpose, namely, one serves as a supply for fresh oil or fluid and the other an exhaust for used oil or fluid. More specifically, the supply opening 173 is biased to an open position to allow a supply of oil 192 to flow into the starter 100 while the exhaust opening 174 is configured to allow oil in the starter 100 to leak back into the gearbox 171. In order to control the flow of the oil 192 between the gearbox 171 and starter 100, the check valve assemblies 176, 177 are installed adjacent the supply and exhaust openings 173, 174.

The supply and exhaust openings 173, 174 are generally configured to receive the inlet and outlet check valve assemblies 176, 177 depending on the types of valves used, such as through threaded engagement, bayonet mount or other mounting methods. Alternatively, the openings 173, 174 can be configured to close around and accept the check valve assemblies 176, 177. The openings 173, 174 are shown positioned towards the outer periphery of the ATS housing 102; however, as will be appreciated by those skilled in the art, the openings 173, 174 can be located at any position to allow fluid communication between the ATS 100 and the gearbox 171. For instance, the ATS housing 102 may include additional walls or cover plates, that may cover certain ATS components within which openings may be formed. Thus, the check valve assemblies 176, 177 can be placed in or over a wall or cover plate opening that may be mounted on the ATS housing 102. Moreover, although the illustration depicts two openings 173, 174, more than two openings between the ATS 100 and gearbox 171 may be employed. Additionally, either the same type of valves or different valves can be used within the valve assemblies.

In the embodiment shown in FIG. 2, exemplary valve assemblies 176, 177 including a supply valve 178 and an exhaust valve 180, that can be used in the supply and exhaust openings 173, 174 are depicted. The inlet valve assembly 176 receives a continuous flow of oil from, for example, a supply line 182 that is configured to supply suitable lubricating fluid, such as oil, from the gearbox 171 to the starter 100. To aid in the control of the fluid flow, the inlet valve assembly 176 includes a fluid receptacle 184 and a supply valve 178 having at least a valve flexure 186 and a valve seat 188.

The receptacle 184 is coupled to the gearbox 171 side of the starter housing 102 proximate the supply opening 173. The receptacle 184 can be, for example, a standpipe, and is preferably configured such that a well or reservoir 190 is defined between the receptacle walls 192 and the starter housing 102. The receptacle 184 can be any one of numerous shapes, such as, for example, substantially L-shaped, as depicted in FIG. 2 and is configured to control the pressure of the fluid within the reservoir 190 to thereby control the flow rate and amount of fluid that flows through the supply opening 173 into the starter 100. Generally, the receptacle 184 is constructed to a predetermined height 194, so that the fluid within the reservoir 190 is supported by a resulting column pressure. As the reservoir 190 becomes full, the fluid contained therein escapes through the supply opening 173 into the starter 100. If the amount of fluid in the reservoir 190 exceeds the capacity of the reservoir 190, the excess fluid flows over the receptacle walls 193 and back into the gearbox 171.

The predetermined height 194 is preferably such that the valve flexure 186 is positioned entirely within the reservoir 190. However, as will be appreciated by those skilled in the art, any height 194 can be employed so long as a desired column pressure is achieved.

The valve flexure 186 is coupled to the gearbox side 171 of the starter housing 102 proximate the supply opening 173 and within the reservoir 190. The valve flexure 186 is configured to either open or close the supply opening 173 in response to a pressure differential between the starter 100 and gearbox 171 and is preferably constructed of a material having spring-like properties, such as, for example, stainless steel, plastic, rubber, or composite materials. The valve flexure 186 has two ends 196, 198. The first end 196 is coupled to the starter housing 102 via any one of numerous coupling methods so as to allow the second end 198 to remain freely movable to selectively open and close the supply opening 173.

Figure 2A:
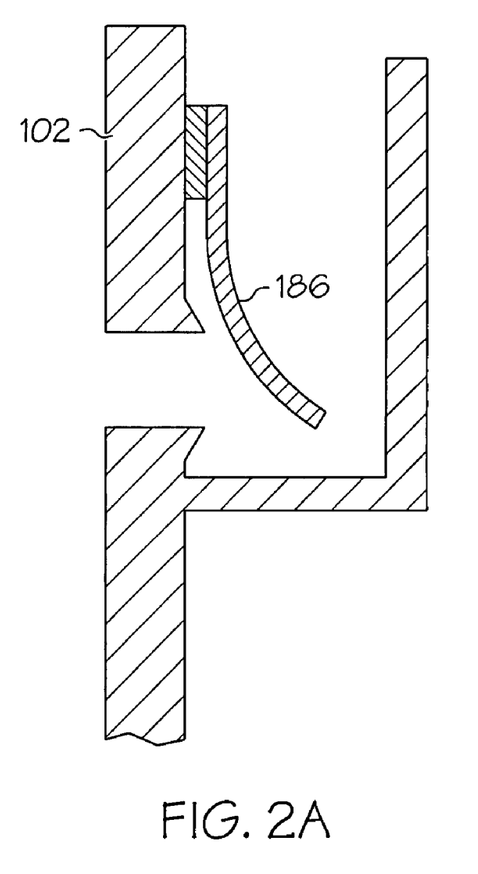
FIG. 2A is a detail and cutaway view of a portion of the air turbine starter of FIG. 1 including an exemplary embodiment of the inlet check valve assembly in an unrestrained state.

When the valve flexure 186 is in normal operation, or when the pressure between the starter 100 and gearbox 171 is approximately zero, the valve flexure 186 is open and is preferably biased open. To this end, the valve flexure 186 preferably is formed such that it curves away from the housing 102, such as shown in FIG. 2A. FIG. 2A depicts a preferred shape of the valve flexure 186. However, to create more control of the pre-load and to control the distance between the valve flexure 186 and the supply opening 173, a stop 200 is preferably contacted with the curved portion of the gearbox-facing side of the valve flexure 186, as shown in FIG. 2.

The stop 200 may either be coupled directly to the valve flexure 186 or optionally, as shown in FIG. 2, coupled to the receptacle wall 192. In yet another alternative, the stop 200 may be coupled directly to the starter housing 102. The stop 200 is preferably a relatively straight, uncurved element constructed of material similar to the material from which the starter housing 102 is constructed. Preferably, the stop 200 has a width that is narrower than the width of the valve flexure 186 so that when it is in contacted with the valve flexure 186, force can still be applied directly to at least a portion of the valve flexure 186. Thus, when a suitable amount of force that results from a pressure differential between the starter 100 and gearbox 171 is applied to the valve flexure 186 so as to overcome the valve flexure 186 preload, the valve flexure 186 closes the supply opening 173. Most preferably, the valve flexure 186 and stop 200 are configured such that the valve flexure 186 can close upon a relatively small pressure differential, such as, for example, between 0.1–6.0 psig. However, as will be appreciated by those with skill in the art, the valve flexure 186 and stop 200 can be configured to respond to any other preferred pressure differential.

The valve seat 188 is generally a sharp protrusion configured to concentrically surround and couple to the region of the starter housing 102 proximate to the supply opening 173. The valve seat 188 can be separately constructed and coupled to the starter housing 102 in any one of numerous fashions or can be formed into the starter housing 102 itself. Optionally, the valve seat 188 can be a flat surface with no sharp edges. In such case, a pressure greater than 0.1–6.0 psi may be needed to cause the valve flexure 186 to open or close the supply opening 173.

The outlet valve assembly 177 includes an exhaust valve 180 that is constructed similar to the supply valve 178. However, although the exhaust valve 180 includes a valve flexure 202 that is coupled to the gearbox side 171 of the starter housing 102 and a valve seat 204, it does not include a receptacle. Just as for the supply valve 178, the exhaust valve flexure 202 is biased open and includes a stop 206. The stop 206 may be coupled directly to the valve flexure 202 or, as shown in FIG. 2, mounted to the starter housing 102.

One embodiment of the method by which the supply valve 178 can be used during normal operating conditions is shown in FIG. 2. In this embodiment, normal operation refers to an instance during which the pressure differential between the ATS 100 and gearbox 171 is about 0 psi. In a time of normal operation, almost no pressure differential exists between the ATS 100 and gearbox 171 sides of the supply and exhaust openings 173, 174. Fluid is continuously fed at a predetermined flow rate through the supply line 182 and fills the reservoir 190. The supply valve flexure 186 remains open to allow the fluid within the reservoir 190 to flow through the supply opening 173. The leaked fluid ultimately travels through oil passages within the starter housing 102 to lubricate and cool the components contained therein. If the reservoir 190 becomes overfilled, the excess fluid leaks over the receptacle wall 192 and down to the bottom of the gearbox 171.

Air and fluid are free to transfer between the starter 100 and the gearbox 171 via the exhaust opening 174. The exhaust valve flexure 202 is biased open so as to allow, oil and/or air to pass between the ATS 100 and gearbox 171 with little to no restriction. The position of the exhaust opening 174 determines the level of the fluid within the starter 100, as excess fluid flows from ATS 100 to gearbox 171 through exhaust opening 174.

Figure 3:
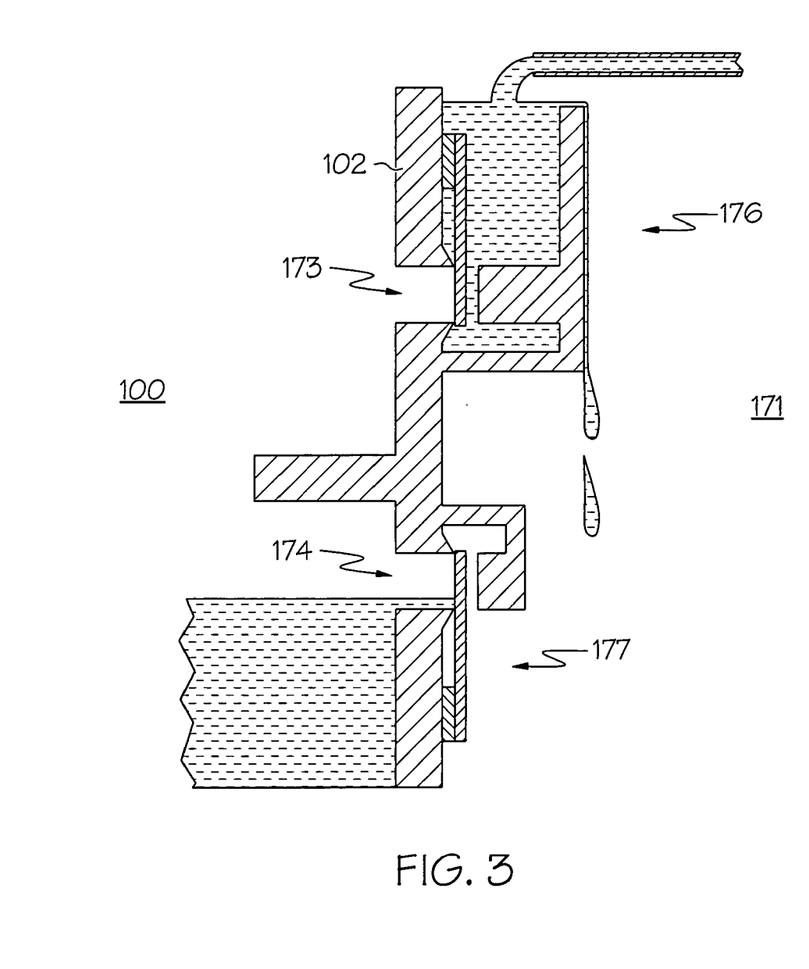
FIG. 3 is a detail and cutaway view of a portion of the air turbine starter of FIG. 1 including an exemplary embodiment of the check valve assemblies under an ATS breach condition.

However, in the unlikely event of ATS 100 puncture, the check valve assembly 176 seals the supply and exhaust openings 173, 174, preferably completely, such that oil and/or air preferably does not pass between the ATS 100 and gearbox 171, as illustrated in FIG. 3. During starter housing 102 breach, typically, the pressure in the ATS 100 drops below the pressure within the gearbox 171. The pressure differential is generally low and can be, for example, about 0.1–6.0 psig. As a result, the force exerted on the gearbox side 171 of the valve flexures 186, 202 becomes greater than the force exerted on the starter side 100, thereby causing the flexures 186, 202 to contact and seal the supply and exhaust openings 173, 174 to prevent flow of oil and/or air therethrough.

Thus, an aircraft turbine starter having improved lubricant flow and fluid flow control in the condition of a starter housing puncture has been provided. Additionally, the air turbine starter provided includes the ability to operate during starter housing breach, and in particular, in instances when the breach causes a low pressure differential between the starter and gearbox.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An air turbine starter, comprising:
   a starter housing adapted to couple to a gearbox assembly, the starter housing including a supply opening and an exhaust opening, each configured to provide fluid communication between the gearbox assembly and the starter housing;
   a receptacle coupled to the starter housing proximate the supply opening to thereby define a reservoir;
   a first valve disposed within the reservoir and configured to open or close the supply opening in response to a pressure differential between the starter housing and the gearbox assembly; and
   a second valve coupled to the starter housing proximate the exhaust opening and configured to open or close the exhaust opening in response to the pressure differential between the starter housing and the gearbox assembly.

2. The air turbine starter of claim 1, wherein the first and second valves each comprise:
   a valve flexure, at least a portion of which is coupled to the starter housing, the valve flexure configured to selectively move between a valve open and valve close position in response to the pressure differential between the starter housing and the gearbox.

3. The air turbine starter of claim 2, wherein the valve flexure has a curve, wherein the curve curves away from the starter housing.

4. The air turbine starter of claim 3, further comprising:
   a stop coupled to the starter housing and configured to provide a biasing force on the valve flexure to bias the valve flexure in an open position.

5. The air turbine starter of claim 3, further comprising:
   a stop coupled to the receptacle and configured to provide a biasing force on the valve flexure to bias the valve flexure in an open position.

6. The air turbine starter of claim 2, wherein the valve flexure comprises a leaf spring.

7. The air turbine starter of claim 2, wherein the valve flexure comprises spring steel.

8. The air turbine starter of claim 2, further comprising:
   a first and a second valve seat each coupled to the starter housing concentric to the supply and exhaust openings and configured to selectively contact each of the valve flexures to provide a leak tight seal when the valve flexures are in the valve close position.

9. The air turbine starter of claim 8, wherein at least a portion of the valve seat configured to contact the valve flexure includes sharp edges.

10. The air turbine starter of claim 1 wherein the receptacle comprises a standpipe.

11. The air turbine starter of claim 1, further comprising:
    a supply line in fluid communication with the reservoir, the supply line configured to supply fluid from the gearbox to the starter housing.

12. The air turbine starter of claim 11, wherein the fluid supply line is further configured to supply a continuous flow of fluid from the gearbox to the starter housing.

13. A check valve assembly for placement proximate an opening in a wall separating a first environment and a second environment, the check valve assembly comprising:
    a valve flexure, at least a portion of which is coupled to the wall proximate the opening and configured to be biased to a valve open position and to selectively move between the valve open position and a valve close position in response to the pressure differential between the first and second environments;
    a valve seat coupled to the wall concentric to the opening and configured to selectively contact the valve flexure to provide a leak tight seal when the valve flexure is in the valve close position; and
    a stop disposed proximate the valve flexure and configured to contact the valve flexure when the valve flexure is in the valve open position.

14. The check valve assembly of claim 13, wherein the valve flexure comprises a leaf spring.

15. The check valve assembly of claim 13, wherein the valve flexure comprises spring steel.

16. The check valve assembly of claim 13, wherein the valve flexure comprises rubber.

17. The check valve assembly at claim 13, wherein the stop is coupled to the receptacle.

18. The check valve assembly of claim 13, wherein the stop is coupled to the wall.

19. The check valve assembly of claim 13, wherein at least a portion of the valve seat configured to contact the valve flexure includes sharp edges.

20. A system for providing fluid between a gearbox and an air turbine starter, the system comprising:
    a starter housing positioned between and adapted to couple to a gearbox assembly and air turbine starter, the plate including a supply opening and an exhaust opening, each configured to provide fluid communication between the gearbox assembly and the air turbine starter;

a receptacle coupled to the starter housing proximate the supply opening to thereby define a reservoir;

a supply line in fluid communication with the reservoir, the supply line configured to supply fluid from the gearbox to the starter housing;

a first valve disposed within the reservoir and configured to open or close the supply opening in response to a pressure differential between the starter housing and the gearbox assembly; and a second valve coupled to the starter housing proximate to the exhaust opening and configured to open or close the exhaust opening in response to the pressure differential between the starter housing and the gearbox assembly.

21. The system of claim 20, wherein the fluid supply line is further configured to supply a continuous flow of fluid from the gearbox to the starter housing.

22. The system of claim 20, wherein the first and second valves each further comprise:

a valve flexure having first and second sides, wherein the first side is coupled to the starter housing and the second side is configured to selectively move between a valve open and valve close position in response to the pressure differential between the starter housing and the gearbox.

23. The system of claim 22, wherein the valve flexure comprises a leaf spring.

24. The system of claim 22, wherein the valve flexure comprises spring steel.

25. The system of claim 22, wherein the valve flexure comprises rubber.

26. The system of claim 22, further comprising:

a valve seat coupled to the starter housing concentric to the opening and configured to selectively contact the valve flexure to provide a leak tight seal when the valve flexure is in a close position.

27. The system of claim 26, wherein at least a portion of the valve seat configured to contact the valve flexure includes sharp edges.

28. The system of claim 22, further comprising:

a stop coupled to the receptacle and configured to provide a biasing force on the valve flexure to bias the valve flexure to the valve open position.

29. The system of claim 22, further comprising:

a stop coupled to the starter housing and configured to provide a biasing force on the valve flexure to bias the valve flexure in an open position.

* * * * *

UNITED STATES PATENT AND TRADEMARK OFFICE
CERTIFICATE OF CORRECTION

PATENT NO. : 7,014,419 B2  Page 1 of 1
APPLICATION NO. : 10/788757
DATED : March 21, 2006
INVENTOR(S) : Gary A. Farnsworth et al.

It is certified that error appears in the above-identified patent and that said Letters Patent is hereby corrected as shown below:

Column 8, line 56, delete "at" and add --of--.

Signed and Sealed this

Twentieth Day of March, 2007

JON W. DUDAS
*Director of the United States Patent and Trademark Office*